UNITED STATES PATENT OFFICE.

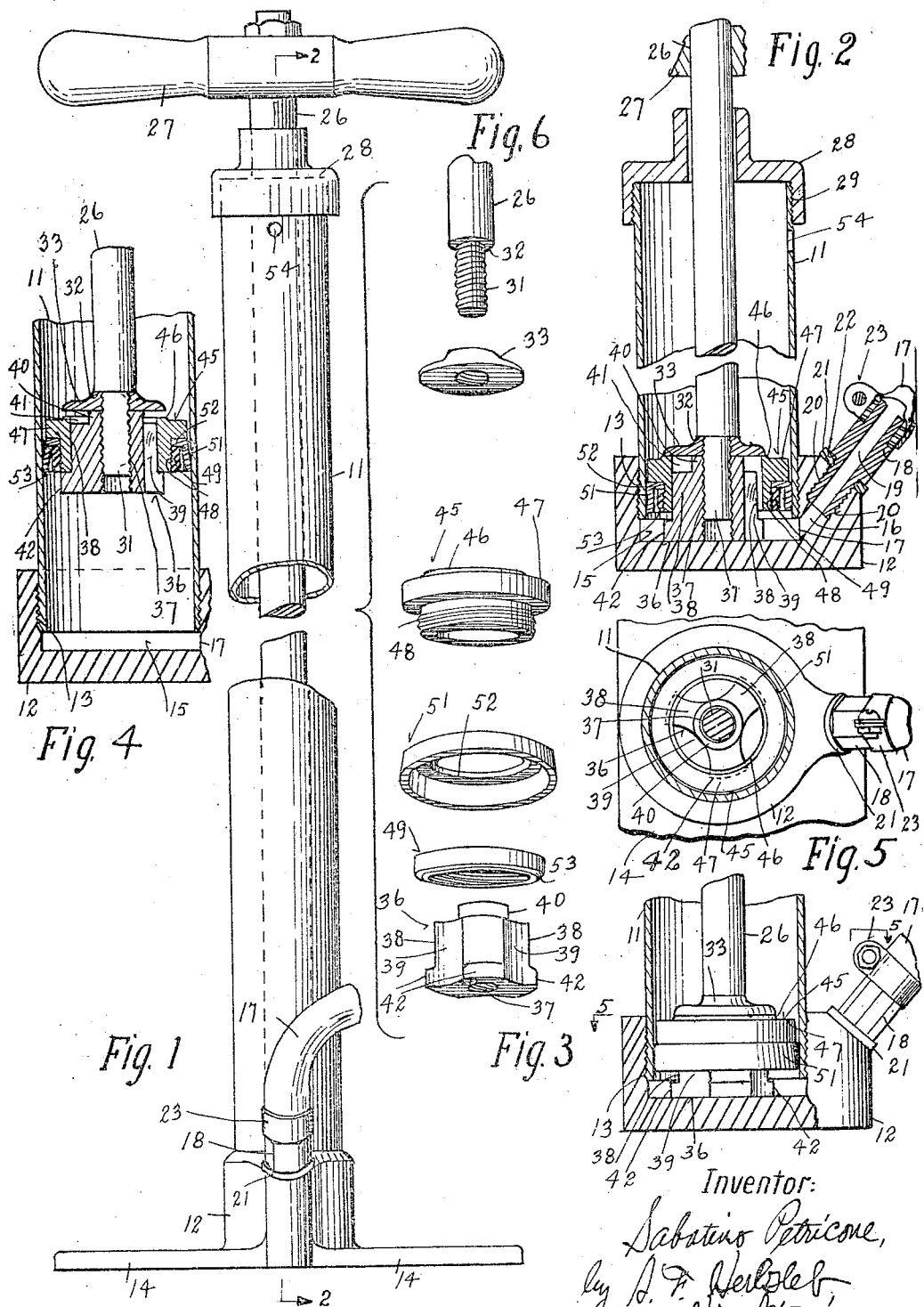

SABATINO PETRICONE, OF NEWPORT, KENTUCKY.

PUMP.

1,381,224.  Specification of Letters Patent.  Patented June 14, 1921.

Application filed August 23, 1920. Serial No. 405,290.

*To all whom it may concern:*

Be it known that I, SABATINO PETRICONE, a citizen of the United States, residing at Newport, in the county of Campbell and State of Kentucky, have invented certain new and useful Improvements in Pumps, of which the following is a specification.

It is the object of my invention to provide a new and improved pump, especially adapted for pumping up tires of automobiles, and to provide a pump of this character of simple construction, and of strong and durable parts, easily assembled, and so arranged as to require minimum exertion in operating the same.

The invention will be further readily understood from the following description and claims, and from the drawing, in which latter:

Figure 1 is a side elevation of a pump embodying my invention, partly broken away.

Fig. 2 is an axial section of the same taken on the line 2—2 of Fig. 1, partly broken away, and showing the movable pump parts in descending relation.

Fig. 3 is a similar axial section with the inner movable pump parts shown in side elevation.

Fig. 4 is a similar axial section, showing the movable parts in ascending relation.

Fig. 5 is a horizontal cross-section of my improved device, taken in the plane of the line 5—5 of Fig. 3, and, Fig. 6 is a perspective view of the movable parts at the lower end of the piston-rod shown in separated relation.

11 represents a cylinder, secured to a base 12, as by a threaded connection 13. The base has laterally extending foot-pieces 14, on which the operator steps for holding the base and the pump firmly in position on the ground.

The base is provided with a recess 15, from which a passage 16 extends. A hose 17 has connection with said passage, as by means of a nipple 18, provided with a bore 19, and having threaded connection 20 with the base, so that the bore thereof communicates with the passage 16. A compressible washer 21 is located between the shoulder 22 on the nipple and the base, for forming an air-tight joint. The flexible hose is firmly held to the nipple, as by means of a clamp 23. This hose communicates with the usual valve of a tire that is being inflated.

A piston-rod 26 is provided with a handle 27, by means of which the operator reciprocates the piston-rod up and down. The piston-rod has bearing in a bearing-cap 28, shown as having threaded connection 29 with the cylinder.

The lower end of the piston-rod is reduced in diameter, as shown at 31, for forming an annular shoulder 32. The reduced lower end of the piston-rod is threaded. A disk 33 has threaded connection with said threaded reduced lower end, and is arranged to be threaded against the shoulder 32. This disk forms a valve seat.

A valve-guide 36 has threaded connection 37 with the threaded lower reduced end of the piston-rod. This valve-guide is provided with radially extending wings 38, between which grooves 39 are located, the grooves extending through the bottom of the valve-guide. These grooves form channels for the passage of air. The valve-guide is screwed over the lower reduced threaded end of the piston-rod, and has an upwardly extending reduced portion 40, which makes contact with the disk and acts to lock the disk in place, and to form an annular air-channel 41 between the wings and said disk, communicating with the passages 39. The lower ends of the wings are provided with radially outwardly extending flanges 42.

A sleeve 45 is arranged to reciprocate between said disk and said last-named flanges, and surrounds said valve-guide and is guided in its reciprocations by the outer peripheral edges of said wings. This sleeve is provided with an annular valve-rib 46, which coacts with the valve-seat 33. The sleeve is also provided with an upper outer annular flange 47. The said valve-rib surrounds said grooves, and said flange is located about said valve-rib.

The sleeve is screw-threaded, as shown at 48. A collar 49 has threaded connection with the last-named screw-threads. A cup-washer 51 has an inwardly extending flange 52, which is arranged to be clamped between the flange 47 and said collar, the collar being located within the skirt of the cup-washer. The cup-washer is of flexible material, for instance leather. The lower outer edge of the collar is reduced in diameter, within said skirt, as shown at 53, to form an air-channel.

In operation, when the operator moves the piston-rod upwardly, the sleeve 45 rests on the flanges 42, and free passage of air is permitted through the annular channel 41 between the disk 33 and the annular valve-rib 46, thence through the passages 39 between the wings 38 and past the sleeve 45, and valve-guide 36, to prevent all back pressure of air on the piston. The weight of the sleeve and the parts mounted thereon, as well as the friction between the cup-washer and the wall of the cylinder, and the upward movement of the piston-rod within the sleeve, will cause this relation of the parts, which is shown in Fig. 4.

When the upward stroke of the piston-rod has been completed, and the downward stroke has been initiated, the valve-guide will pass downwardly within the sleeve, until contact is made between the valve-seat 33 and the valve-rib 46, whereupon all parts of the valve will move downwardly together. This relation of parts is shown in Figs. 2 and 3. This downward movement will cause pressure under the valve, and in the annular channel formed by the reduced end 53 of the collar 49, between the collar and the skirt of the cup-washer, directing the pressure of air into the inside of the cup-washer and spreading the skirt into close contact with the wall of the cylinder to prevent passage of air between said cup-washer and the wall of the cylinder, the passage of air past the valve also being prevented by the seating of the valve upon the valve-seat, thereby assuring full pressure upon the downward stroke of the piston.

A port 54 in the upper end of the cylinder permits ready entrance of air into the cylinder upon the downward stroke of the piston. Upon the next up-stroke of the piston, the ribbed valve-guide will immediately move upwardly within the valve-sleeve for opening the valve with a complete opening, permitting ready and rapid upward movement of the piston-rod, preventing back pressure upon the piston, and filling the cylinder with air below the piston, ready for compression upon the next down stroke of the piston-rod.

The parts are of simple construction, readily taken apart for renewal of the cup-washer, and the valve-parts may be readily taken from the piston-rod for attention or regrinding, and the parts readily and quickly assembled. The parts are furthermore strong and durable, and so arranged and secured in place and guided as to prevent undue wear.

Having thus fully described my invention, what I claim as new, and desire to secure by Letters Patent, is:

A pump comprising a cylinder, a piston-rod, the lower end of said piston-rod threaded and reduced in diameter to form an annular shoulder, a disk forming a valve-seat, received over said threaded end, a valve-guide having threaded connection with said threaded lower reduced end to lock said disk to said valve-stem, said valve-guide provided with radial wings and with grooves between said wings to form passages, a sleeve about said wings, said sleeve provided with an upper annular valve-rib surrounding said passages and with an upper outer annular flange surrounding said valve-rib, and a depending cup-washer clamped to said flange and co-acting with said cylinder, said wings provided with flanges to hold said sleeve to said valve-guide, and said sleeve arranged to reciprocate between said last named flanges and said disk.

In testimony whereof, I have hereunto signed my name in the presence of two subscribing witnesses.

SABATINO PETRICONE.

In presence of—
DAWSON E. BRADLEY,
CECELIA C. ZIEGLER.